J. CRUMLISH.
MILK BOTTLE RETAINING DEVICE.
APPLICATION FILED DEC. 15, 1919.
1,363,397.
Patented Dec. 28, 1920.
2 SHEETS—SHEET 1.
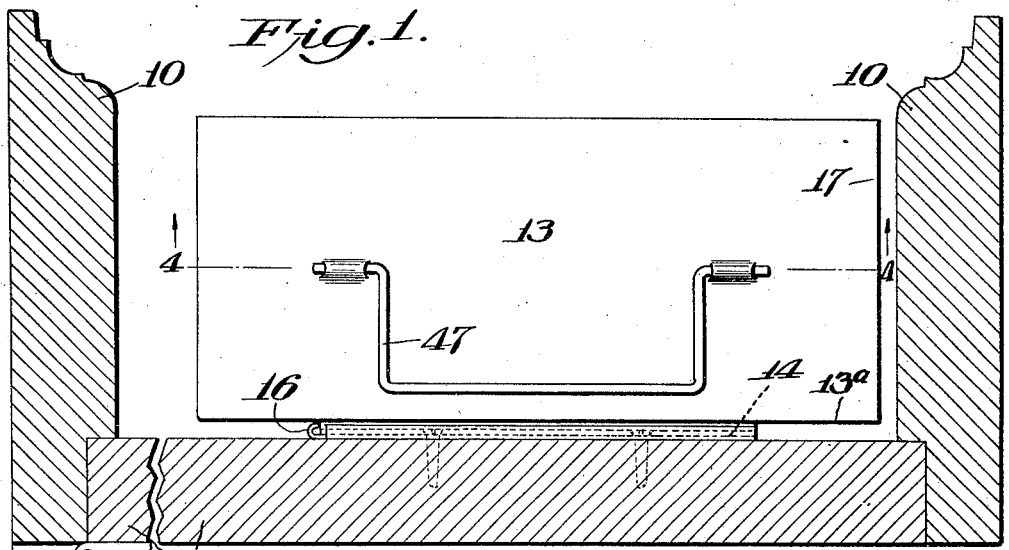
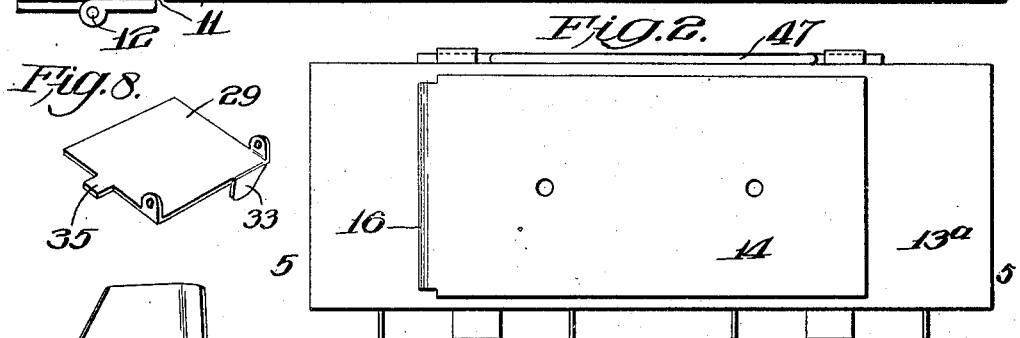
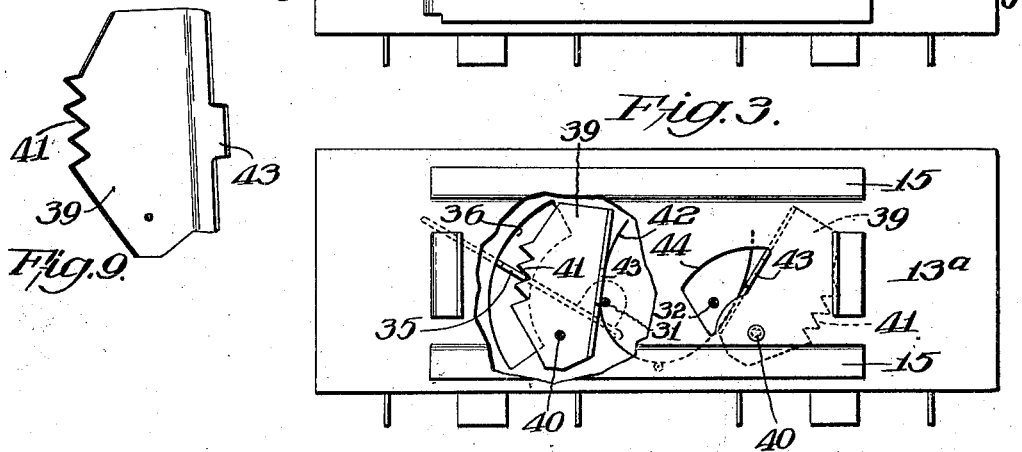
Witnesses:
Inventor
John Crumlish,
By Joshua R. H. Potts
his Attorney

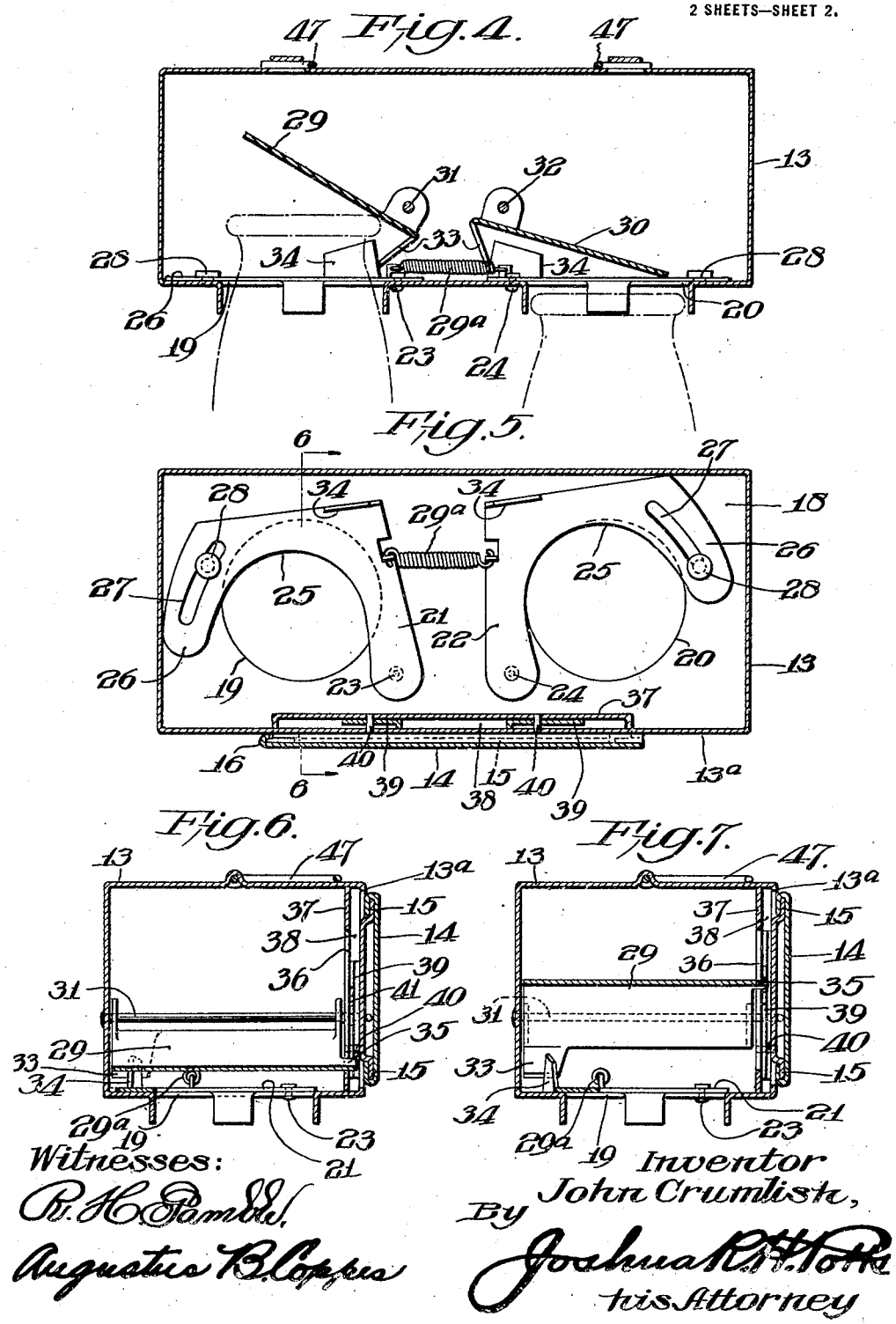

UNITED STATES PATENT OFFICE.

JOHN CRUMLISH, OF PHILADELPHIA, PENNSYLVANIA.

MILK-BOTTLE-RETAINING DEVICE.

1,363,397.         Specification of Letters Patent.    Patented Dec. 28, 1920.

Application filed December 15, 1919. Serial No. 344,773.

*To all whom it may concern:*

Be it known that I, JOHN CRUMLISH, a citizen of the United States, residing at Philadelphia, in the county of Philadelphia, and State of Pennsylvania, have invented certain new and useful Improvements in Milk-Bottle-Retaining Devices, of which the following is a specification.

It is well known that bottles of milk are often stolen from door-steps or other exposed places due to the fact that the milkman usually delivers the bottles of milk by merely setting the bottles on a door-step or porch and it is an easy matter for a person to steal the bottles which are not attached or locked to any supporting structure. Furthermore, the delivery of milk in the above described manner subjects the bottles to a collection of dirt from the street and other causes.

One object of my invention is to provide an improved milk bottle retaining device into which the milkman can insert the necks of one or more bottles of milk and which will act to lock the bottles thus inserted to prevent them from being stolen and at the same time will prevent dirt from collecting on the necks of the bottles.

Another object is to so construct my invention that the latter can be attached to a door or door frame and cannot be removed until the door has been opened, after which the device can be readily removed by the owner and the milk bottles can be easily detached from the device.

These objects, and other advantageous ends which will be described hereinafter, I attain in the following manner, reference being had to the accompanying drawings in which—

Figure 1 is a top plan view showing my invention as it appears in position attached to a door so that it cannot be removed until after the door has been opened; the door and door frame being shown in section, Fig. 2 is a rear elevation of my invention; the door and door frame being omitted, said view showing a supporting plate which forms a part of the device, Fig. 3 is a view of similar nature to Fig. 2 showing said supporting plate omitted and a portion of the back plate broken away, Fig. 4 is a longitudinal section taken on the line 4—4 of Fig. 1 and illustrating the device adapted to receive and retain two milk bottles therein, Fig. 5 is a sectional plan view taken on the line 5—5 of Fig. 2, Fig. 6 is a transverse section taken on the line 6—6 of Fig. 5, Fig. 7 is a transverse section taken on the line 6—6 of Fig. 5, showing certain of the parts in another position, Fig. 8 is a perspective view of a setting plate which forms a part of my invention, and Fig. 9 is a perspective view of a pivoted detent latch which forms a part of my invention.

Referring to the drawings, 10 represents a door frame to which a door 11 is hinged at 12.

My invention includes a box 13 and a supporting plate 14. The back plate 13ª of the box 13 has rails 15 projecting therefrom and the top and bottom edges of the supporting plate 14 are bent inwardly to provide grooves so that the supporting plate can be slid onto the rails 15. One end 16 of the supporting plate 14 is bent as shown in Figs. 1 and 5 so as to abut the ends of the rails to limit the sliding movement between the box and supporting plate in one direction. Thus when the supporting plate is secured to a door, such for example as shown in Fig. 1, the end 17 of the box can be located adjacent one side of the door frame 10 and when the door 11 is closed, the box 13 cannot be slid off the supporting plate. However, when the door 11 has been opened the door 13 can be entirely slid off or on the supporting plate as above described.

The box 13 has a bottom plate 18 provided with two holes 19 and 20. Two retaining arms 21 and 22 are pivoted at 23 and 24 respectively to the bottom plate 18. Each of these retaining arms 21 and 22 has an arcuate edge 25 and free ends 26 which have slots 27. Pins 28 extend upwardly from the bottom plate 18 and through the slots 27. A coil spring 29ª has its opposite ends connected to the arms 21 and 22 and tends to normally move said arms toward each other so as to move the arcuate edges 25 substantially in register with the edge portions of the bottom plate 18 which form the holes 19 and 20. Fig. 5 shows the retaining arm 22 in its normal position and the arm 21 in its locking position as will hereinafter be more thoroughly described.

Two setting plates 29 and 30 are pivotally connected to the box by pivot rods 31 and 32 respectively. The major portions of these setting plates are directly above the respective holes 19 and 20. Each of the setting plates 29 and 30 has a depending lip 33. These lips 33 are adapted to respectively engage lugs 34 which project upwardly from the retaining arms 21 and 22. The arrangement of the pivot rods 31 and 32 is such that when the setting plates are raised on their pivots, for example into the position occupied by the plate 29 in Fig. 4, the lips 33 will push against the lugs 34 and thereby swing the retaining arms against the action of the spring 29<sup>a</sup>.

Each of the setting plates 29 and 30 has an extension 35. These extensions project outwardly through slots 36 in a partition plate 37; said partition plate being spaced inwardly from the back plate to provide a chamber 38. Detent plates or latches 39 are pivoted at 40 within the chamber 38 eccentric to the respective pivot rods 31 and 32, as clearly shown in Fig. 3. Each of the pivoted detent plates 39 has teeth 41 cut in one edge and a looped spring 42 tends to move the detent plates 39 on their pivots so that when the extensions 35 of the setting plates are moved upwardly into engagement with the teeth 41 the teeth will hold the setting plates in their raised positions due to the jamming of the extensions 35 between the teeth 41, as clearly shown at the left hand side of Fig. 3. Each of the pivoted detent plates 39 has a handle 43, and these handles project out of the box apertures 44 into the space between the rails 15. However, it will be noted that when the box 13 is on the supporting plate 14 that access to the handles 43 is prevented and it is necessary to remove the box from the supporting plate before access may be had to said handles 43. It is obvious that by moving detent plates 39 by means of the handles that the extensions 35 will be released from the teeth 41 and the spring 29<sup>a</sup> will act to swing the setting plates into their lowered positions.

Considering that the setting plates are in their lowered positions, such for example as the position in which the setting plate 30 is illustrated in Fig. 4, the milkman inserts the necks of the bottles upwardly through the holes and during this inserting movement the tops of the bottles raise the setting plates and the retaining arms are swung under the usual flanges or beaded tops of the milk bottles and thereby lock the latter to the device.

During the upward movement of each setting plate, the extension 35 engages the teeth 41 and slightly rocks the detent plate. Fig. 4 shows the setting plate 29 having been thus raised by the top of the bottle and when the bottle is allowed to slightly drop, the detent plate will move into a jamming position with the respective extension 35 and thereby hold the setting plate in its raised position with the arcuate edge portion of the retaining plate jamming the bottle under the top flange for example as shown in Fig. 7. Thus the milk bottles will be securely locked to the box and it will be necessary to move the detent plates by their handles 43 before the milk bottles can be released. This can only be done after the door has been opened and the box has been removed from the supporting plate.

The box is preferably provided with a carrying handle 47 to facilitate the carrying of the box.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a box having a hole therein; a retaining arm movable in a plane substantially parallel with the plane of the part of the box including the hole; a setting plate in alinement with said hole and having a part for engagement with a portion of said retaining arm whereby when the setting plate is moved upwardly away from said hole, said arm will be moved to restrict the opening provided by said hole; and means operative to hold the arm in said moved position; substantially as described.

2. A device of the character described including a box having a hole therein; a retaining arm movable in a plane substantially parallel with the plane of the part of the box including the hole; a setting plate in alinement with said hole and having a part for engagement with a portion of said retaining arm whereby when the setting plate is moved inwardly away from said hole said arm will be moved to restrict the opening provided by said hole; a pivoted detent latch having teeth thereon and adapted to be engaged by a part of said setting plate during said latter movement thereof; and means for automatically moving said detent latch so as to cause said latter part of the setting plate to jam between said teeth; substantially as described.

3. A device of the character described including a box having a hole therein; a retaining arm movable in a plane substantially parallel with the plane of the part of the box including the hole; a setting plate in alinement with said hole and having a part for engagement with a portion of said retaining arm whereby when the setting plate is moved inwardly away from said hole, said arm will be moved to restrict the opening provided by said hole; means automatically operative for holding said setting plate in said latter position; means extending out of said box for releasing said detent latch from said setting plate; and means for automatically returning said retaining arm and setting plate to their normal positions; substantially as described.

In testimony whereof I have signed my name to this specification in the presence of two subscribing witnesses.

JOHN CRUMLISH.

Witnesses:
CHAS. E. POTTS,
ANNA RENTON.